US011835034B1

(12) United States Patent
Gracia Suberviola

(10) Patent No.: US 11,835,034 B1
(45) Date of Patent: Dec. 5, 2023

(54) LIGHTNING BYPASS SYSTEM

(71) Applicant: General Electric Renovables Espana, S.L., Barcelona (ES)

(72) Inventor: Raul Gracia Suberviola, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/870,950

(22) Filed: Jul. 22, 2022

(30) Foreign Application Priority Data

Jul. 31, 2021 (EP) .................................... 21382729

(51) Int. Cl.
*F03D 80/30* (2016.01)
*F03D 1/06* (2006.01)

(52) U.S. Cl.
CPC ........... *F03D 80/30* (2016.05); *F03D 1/0658* (2013.01)

(58) Field of Classification Search
CPC .............................. F03D 1/0658; F03D 80/30
See application file for complete search history.

(56) References Cited

U.S. PATENT DOCUMENTS

| 8,643,997 | B2 * | 2/2014 | Lyngby | ..................... H02H 7/24 361/117 |
| 9,631,502 | B2 * | 4/2017 | Zeller | ..................... F03D 80/30 |
| 10,753,342 | B2 * | 8/2020 | Nieuwenhuizen | ..... H02G 13/80 |
| 11,286,912 | B2 * | 3/2022 | Vinke | ..................... F03D 80/30 |
| 2015/0167642 | A1 * | 6/2015 | Hansen | .................. F03D 1/0658 416/146 R |
| 2016/0169206 | A1 | 6/2016 | Spielmann et al. | |

FOREIGN PATENT DOCUMENTS

| CN | 103899496 A | 7/2014 | |
| EP | 2795122 A1 | 10/2014 | |
| EP | 2855929 A1 | 4/2015 | |
| EP | 2930356 B1 * | 1/2019 | ........... F03D 1/0675 |
| WO | WO2019228971 A1 | 12/2019 | |

OTHER PUBLICATIONS

Machine translation of EP 2,930,356 B1; Retrieved from ESPACENET on Jul. 14, 2023 (Year: 2023).*
European Search Report Corresponding to EP21382729 dated Jan. 20, 2022.

* cited by examiner

*Primary Examiner* — Courtney D Heinle
*Assistant Examiner* — Sang K Kim
(74) *Attorney, Agent, or Firm* — Dority & Manning, P.A.

(57) ABSTRACT

A lightning bypass system for a blade (22) of a wind turbine (10), the lightning bypass system comprising a blade connector (110) comprising an electrically insulating material (114) and configured to be located substantially in a rotational axis (R) of a blade root (24) of a wind turbine blade (22). The blade connector (110) is configured to be electrically connected to a down conductor cable (100) of the blade (22), and comprises a core configured to be electrically connected to a first end (111) and a second end (112) of the blade connector (110). The present disclosure further relates to methods for providing lightning bypass systems and to wind turbine hub assemblies comprising a lightning bypass system.

15 Claims, 5 Drawing Sheets

LIGHTNING BYPASS SYSTEM

FIELD

The present disclosure relates to lightning bypass systems and methods for providing a lightning bypass system, and more particularly relates to lightning bypass systems for wind turbines and associated methods. The present disclosure further relates to wind turbine rotor hub assemblies.

BACKGROUND

Wind turbines are broadly used to convert the wind power into electricity. The generated electricity can be supplied to an electrical grid and directed to consumers. Wind turbines generally comprise a tower on top of which a nacelle is mounted. A rotor comprising a rotor hub, or hub, and a plurality of blades are generally rotatably mounted with respect to the nacelle. The plurality of blades use the aerodynamic forces generated by the wind to produce a net positive torque on a rotating shaft, resulting in the production of mechanical power, which is then transformed to electricity in a generator.

The blades may be directly connected to the rotor hub or may be connected through a pitch bearing. A pitch system can rotate a blade along its longitudinal axis, allowing modification of the angle of attack of the wind turbine blade with respect to the incoming air flow. The aerodynamic forces acting on the blade can thereby be controlled.

Wind turbines have evolved rapidly over the last decades and wind turbine components have been modified to withstand higher loads and adverse weather conditions. Due to the height and exposure of wind turbines, it is important to provide them with effective lightning protection systems to evacuate lightning discharges from the lightning impact location to ground without affecting electrical or structural components of the wind turbine.

In general, lightning protection systems include a lightning receptor provided on a wind turbine blade to conduct the lightning discharge to a ground connection via a lightning down conductor provided within the blade. One of the main issues with known lightning protection systems is how to conduct the lightning discharge from the down conductor in the blade to a ground connection provided at the wind turbine rotor hub, nacelle or tower.

Spark gaps and/or electrical brushes are generally used with this objective, providing an electrical path between wind turbine moving components such as the wind turbine blade root and the rotor hub and/or the rotor hub and the nacelle. However, these approaches present some drawbacks. Providing spark gaps in a blade is not a trivial solution. These systems comprise at least two conductive strips arranged close to each other in order to provide a conductive connection between them to bypass a connection between wind turbine components, for example the blade root to rotor hub connection. In such spark gap systems, the lightning down conductor may need to pass through the wall of the blade body or through the blade root flange to contact the first conductor strip and therefore in some cases, a through hole on the blade root should be provided. Said through hole may have a negative impact on the structural stability of the blade, requiring further blade strengthening. Further, the through hole should be sealed once the down conductor has been inserted to avoid any leakage to the interior of the blade. In addition to the aforementioned drawbacks, periodical maintenance of the spark gap system should be carried out to assure cleanness and precise clearance gap.

Further, a potential malfunction of the lightning protection system due to the misalignment of its components, due to accumulation of debris from atmospheric deposition and/or wear of the components can promote the lightning discharge not to follow the established electric path to ground but a least resistive path through other wind turbine components. This implies that electrical and/or structural components, such as blade pitch bearings, may act as lightning discharge conductors, shortening severely their lifespan and incurring in high replacement costs.

The present disclosure provides methods and systems to at least partially overcome some of the aforementioned drawbacks.

SUMMARY

In an aspect of the present disclosure, a lightning bypass system for a wind turbine is provided. The lightning bypass system comprises a connector assembly including a blade connector comprising an electrically insulating material. Further, the blade connector comprises a first end configured to be electrically connected to a down conductor cable of the blade and a second end configured to conduct a lightning discharge to a rotor hub of the wind turbine. The blade connector further comprises a core of electrically conductive material configured to be electrically connected to the first end and the second end. The blade connector is configured to be located substantially in a rotational axis of a blade root of a wind turbine blade.

According to this aspect, the fact that the blade connector is located substantially in a rotational axis of the blade root allows a compact and robust lightning bypass system layout, wherein the rotation of the blade to modify the blade pitch angle does not generate a relative movement between components of the lightning bypass system. This allows adjusting the length of the conductive elements associated with the lightning system and to establish a conductive path that does not change its internal location within the blade with the blade pitch angle. Both of these aspects lead to a more secure connection and allow using the internal blade and rotor space more efficiently.

Further, in this way, the system bypasses any structural and electrical blade component not intended to receive the lightning discharge, and in particular the pitch bearing. The components of the pitch bearing system are thus protected from strong temperature gradients and their lifespan may be enhanced.

In an additional aspect, a method for providing a lightning bypass assembly system is provided. The method comprises providing a blade connector made of an electrically insulating material substantially located in a rotational axis of a blade root of the wind turbine. The blade connector comprises a first end, a second end and a core of electrically conductive material electrically connected to the first end and the second end. The method further comprises connecting the first end of the blade connector to a down conductor cable of a lightning receptor of a blade, providing a rotatable connection between the first end and the second end of the blade connector, and conductively coupling the blade connector to a lightning grounding system of a wind turbine.

In a further aspect of the present disclosure, a wind turbine hub assembly is provided. The assembly includes a wind turbine rotor hub, at least one wind turbine blade, and a lightning bypass system. The wind turbine blade comprises a blade root, and the lightning bypass system comprises a blade connector comprising an electrically insulating material secured to the wind turbine blade and located substantially in a rotational axis of the blade root of the wind turbine, and a hub connector made of an electrically insulating material secured to the rotor hub of the wind turbine. Further, the blade connector comprises a first end configured to be electrically connected to a down conductor cable of the blade, a second end configured to conduct a lightning discharge to the hub connector and a core of electrically conductive material configured to electrically connect the first end and the second end, wherein the second end is rotatable with respect to the first end.

Additional objects, advantages and features of examples of the present disclosure will become apparent to those skilled in the art upon examination of the description, or may be learned by practice of the disclosure.

Throughout the present disclosure, and with respect to the various examples disclosed herein, it should be noted that that the blade root portion might be directly coupled to a rotor hub, to rotor hub extenders, to pitch bearings or to any other element of the rotor hub known in the art for this purpose.

Electrically insulating materials as used throughout the present disclosure may be understood to refer to materials in which electric current does not flow freely. Electrical insulators have a high electrical resistivity. Rubbers, glass and plastics are examples of electrical insulators. Electrically conducting materials as used throughout the present disclosure may be understood as materials that allow the flow of electrical current. Electrically conducting materials have a low electrical resistivity. Copper and aluminum wires or cables are examples of electrical conductors.

DETAILED DESCRIPTION OF EXAMPLES

Figure 1:
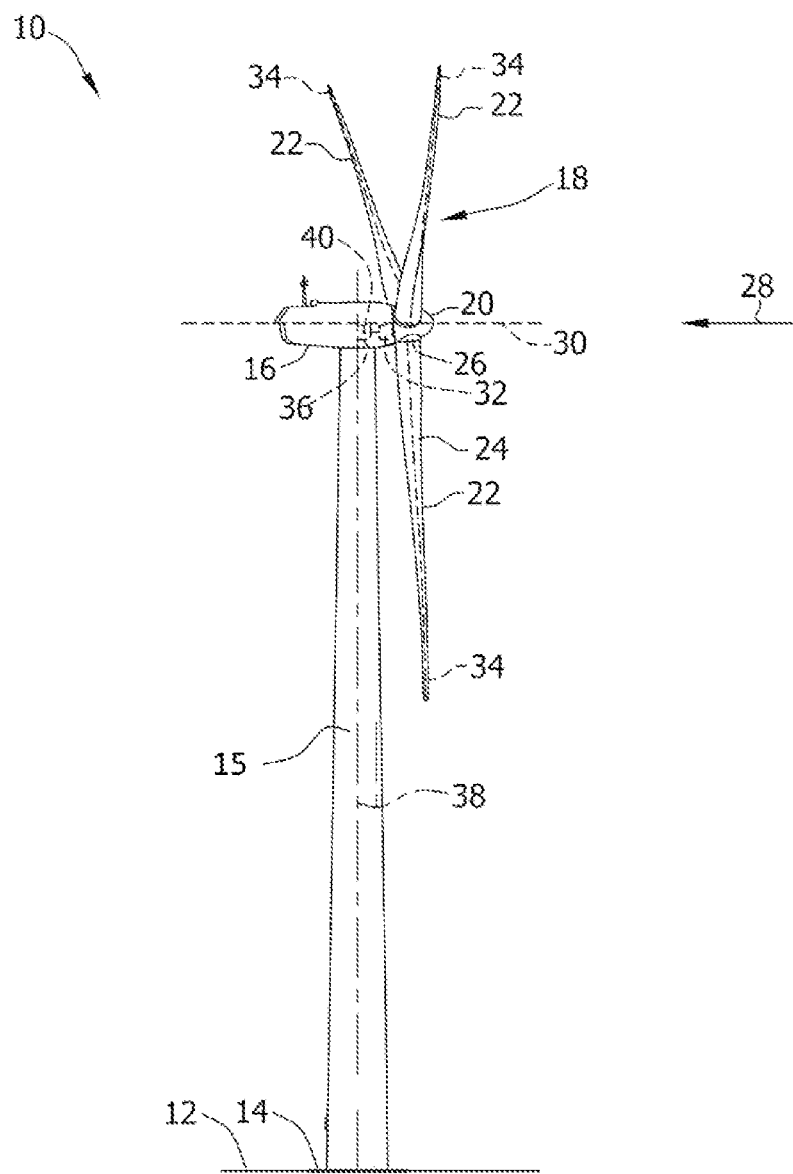
FIG. 1 schematically illustrates a perspective view of one example of a wind turbine.

Reference now will be made in detail to embodiments of the disclosure, one or more examples of which are illustrated in the drawings. Each example is provided by way of explanation of the disclosure, not as a limitation thereof. In fact, it will be apparent to those skilled in the art that various modifications and variations can be made without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
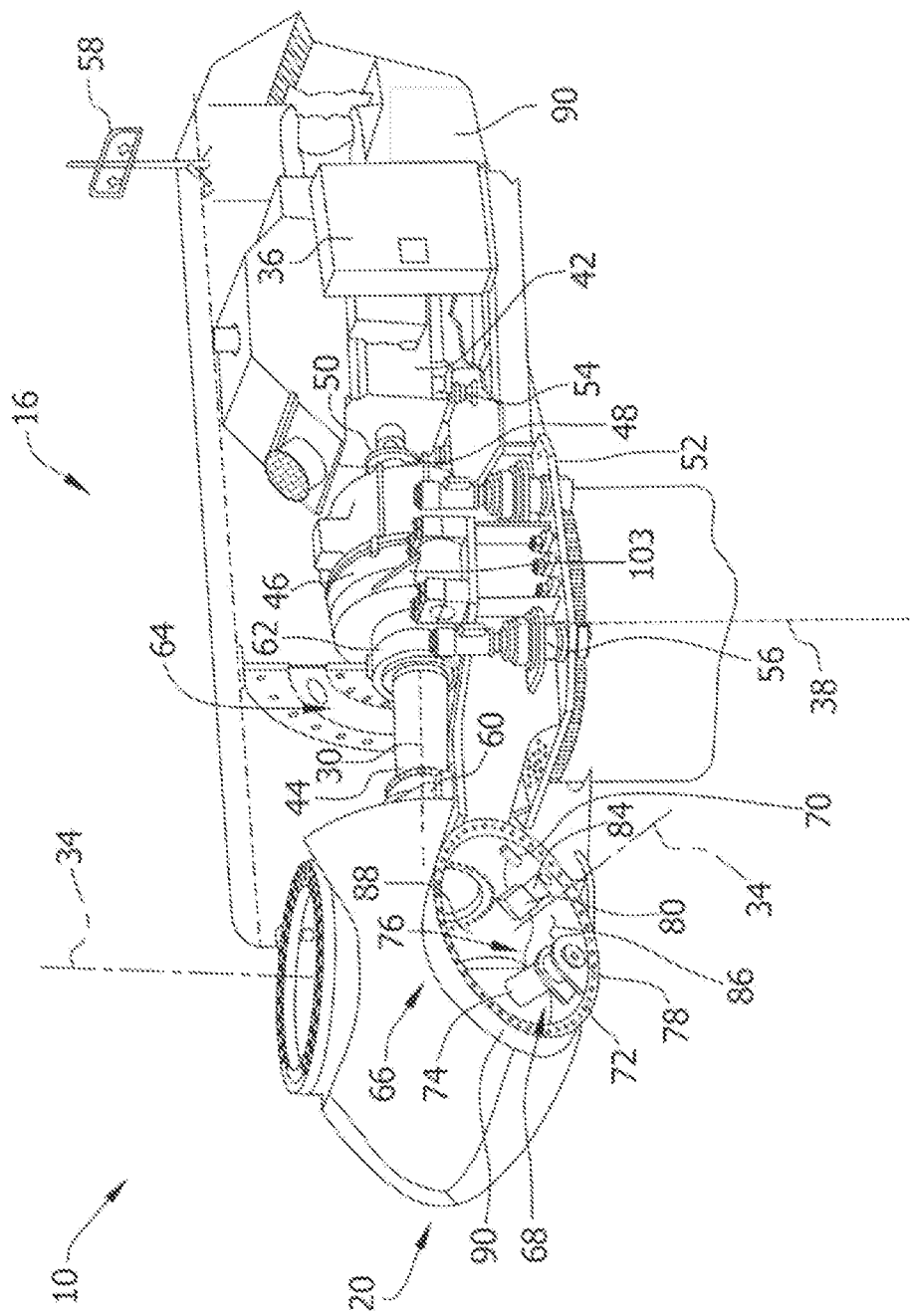
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
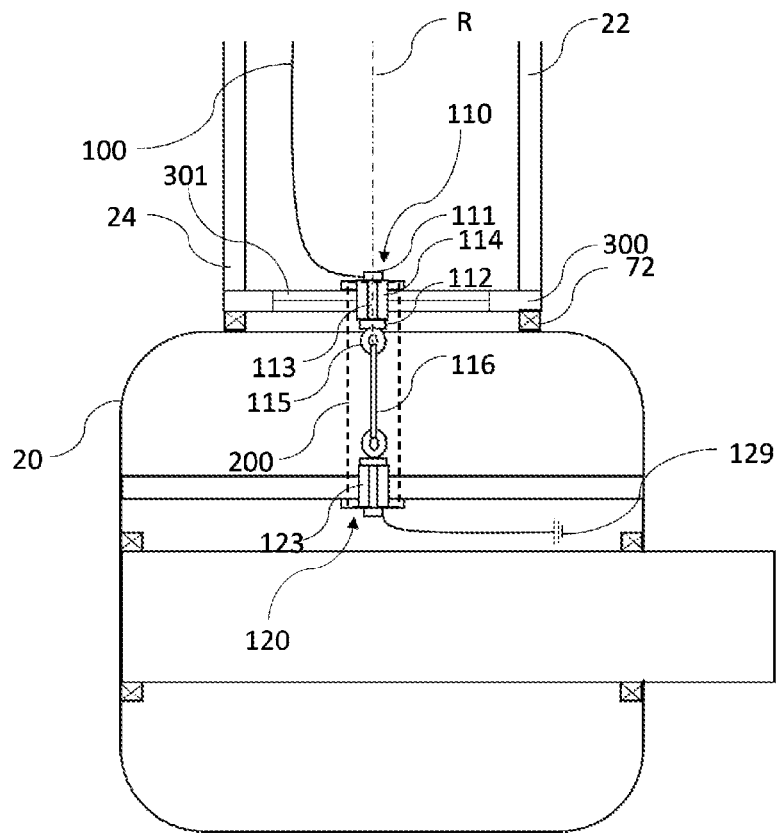
FIG. 3 schematically illustrates a cross-sectional view of a wind turbine rotor assembly comprising an example of a lightning bypass system according to the present disclosure.

FIG. 3 is a schematical cross-sectional view of a wind turbine rotor hub comprising an example of a lightning bypass system. Note that the thickness of the internal walls has been included schematically and that the intersection of solid bodies with the cutting plane has not been indicated with hatching with the sole objective to reduce clutter.

FIG. 3 shows a lightning bypass system for a blade 22 of a wind turbine, the lightning bypass system comprising a blade connector 110 comprising an electrically insulating material 114 and configured to be located substantially in a rotational axis R of a blade root 24 of a wind turbine blade. The blade connector 110 comprises a first end 111 configured to be electrically connected to a down conductor cable 100 of the blade 22, a second end 112 configured to conduct a lightning discharge to a hub 20 of the wind turbine and a core 113 of electrically conductive material configured to be electrically connected to the first end 111 and the second end 112.

The blade connector may comprise an electrically insulating fastener 114 for connecting the blade connector 110 to the blade root, in particular a blade flange, a plate arranged in the blade root or similar. The electrically insulating fastener 114 may be a bushing.

Additionally, FIG. 3 shows that the second end 112 of the blade connector 110 may be rotatable with respect to the first end. In the illustrated example, the second end 112 of the blade connector 110 includes a rotatable eye bolt connector 115. However, other types of connectors can also be used.

In examples, the lightning bypass system may further comprise an electrical connection between the second end of the blade connector and a wind turbine nacelle. The rotatable electrical connection may comprise a conductive surface, a brush to provide electrical contact with the conductive surface, and the second end of the blade connector being electrically connected to one of the conductive surface and the brush. The electrical connection to the conductive surface or brush may be direct (e.g. a direct cable) or indirect (through further connectors, interfaces and elements).

Furthermore, FIG. 3 shows that the connector assembly may further comprise a hub connector 120 made of an electrically insulating material 123 and secured to the hub 20 of the wind turbine. The hub connector 120 may also comprise a core 121 of electrically conductive material, electrically connected to the second end 112 of the blade connector 110 through a conductive element 116.

The conductive element may define a path of connection 200. Note that the path of connection 200 has been illustrated conceptually with broken lines. In the illustrated example of FIG. 3, the hub connector 120 is electrically coupled to a grounding system 129; however, other arrangements are also possible. For instance, in situations wherein the hub connector 120 is not present the grounding system 129 can be alternatively coupled to the second end 112 of the hub connector 110.

The hub connector 123 may include a fastener made of an electrically insulating material for connecting to a portion of the hub. The fastener 123 may be a bushing.

FIG. 3 also shows a partial view of a wind turbine blade comprising the lightning bypass system previously disclosed. More particularly, FIG. 3 illustrates the blade root portion 24 of a wind turbine blade and the arrangement of the lightning bypass system within the same. In addition, in this example the wind turbine blade further comprises at least one crossbar 301 located across the blade root 24 to secure the blade connector 110 substantially in the rotational axis R of the blade root 24. Alternatively, an extension of a blade flange 300 or other alternatives may also be used to secure the blade connector 110 in place. As an example, the wind turbine blade may also or alternatively comprise a blade root stiffener or blade flange 300 substantially covering the complete blade root. In the example shown, the wind turbine blade comprises both a stiffener or flange 300 and a crossbar 301 connecting diametrically opposed sides of the same and securing the blade connector 110 in place.

Figure 4:
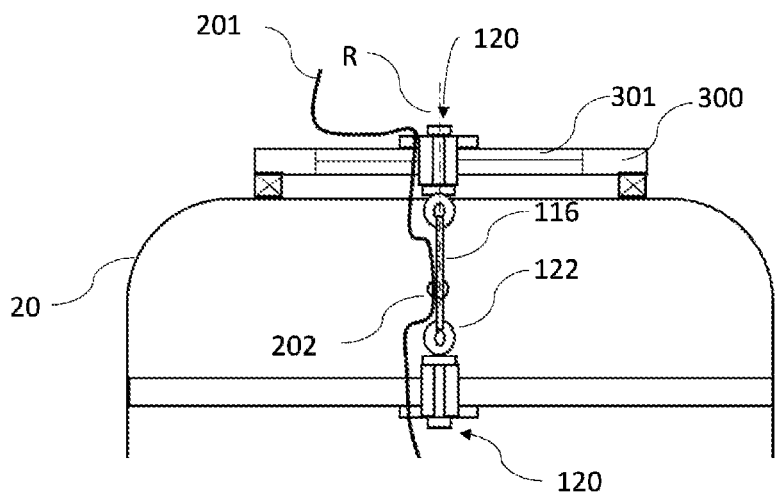
FIG. 4 is a detailed cross-sectional view schematically illustrating a wind turbine rotor assembly comprising another example of a lightning bypass system according to the present disclosure.

FIG. 4 shows a detailed view of another example of a lightning bypass assembly wherein several components, such as the grounding system, have not been illustrated to reduce clutter. This figure shows an example of the path of connection between the blade connector 110 and the previously disclosed hub connector 120. In this example, the conductive element 116 is a metal sling which may include an electrically insulating material cover to protect other components from the current that may flow through it during lightning discharge. Other types of conductive elements such as a metal rods or cables can also be used. Further, FIG. 3 shows that the hub connector 120 may also comprise an eye bolt connector 122 to provide additional rotational freedom and reduce torsion stresses on connecting elements.

The eye bolt connector 122 (in both examples of FIGS. 3 and 5) may be rotatably mounted in electrically insulating bushing 123. Similarly, the eye bolt connector 115 may be rotatably mounted in electrically insulating bushing 114.

In examples, the conductive element 116 may define a path of connection that serves as a guide for additional cable bundles 201. In the present example, the cable bundle 201 may be a bundle of cables (e.g. fibre optic cables) connected to sensors in the blade. The sensors and cables may form part of wind turbine subsystems (i.e. blade monitoring system, lightning monitoring system, de-icing system, blade aviation lightning system) that extends from the blade root 24 to the rotor hub 20 following said path of connection. The cable bundle 201 may be coupled to the conductive element 116 by means of fasteners 202 and/or may be guided by the blade and hub connectors 110, 120.

Figure 5:
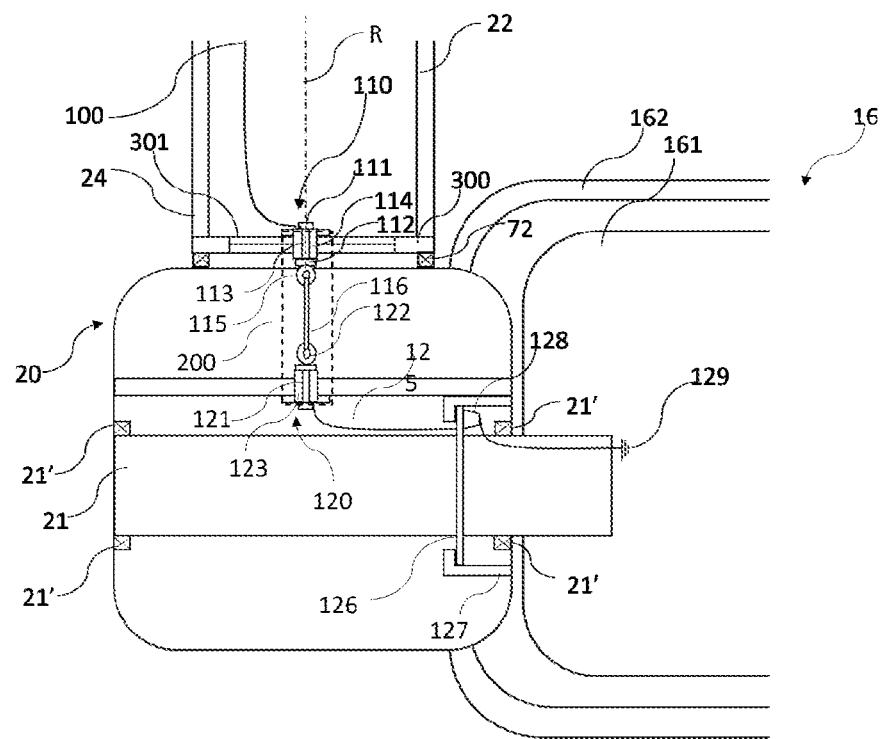
FIG. 5 schematically illustrates a cross-sectional view of a wind turbine rotor and nacelle assembly comprising another example of a lightning bypass system according to the present disclosure.

FIG. 5 is a schematic cross-sectional view of a wind turbine rotor hub and nacelle comprising yet another example of a lightning bypass system. The connection between down conductor from the blade towards the hub may generally be the same or similar to the example illustrated in FIGS. 3 and 4.

In the example shown in FIG. 5, the lightning bypass system further comprises a rotatable electrical connection between the second end 112 of the blade connector 110 and a wind turbine nacelle 16. The rotatable electrical connection comprises a conductive surface 126, and a brush 128 to provide electrical contact with the conductive surface 126. The lightning bypass system further comprises a conductive connection to the second end 112 of the blade connector 110 and to one of the conductive surface 126 and the brush 128. In the example shown, a conductive cable 125 is physically connected to a hub connector 120, which in the way described before with reference to FIGS. 3 and 4, is connected to blade connector 110 and the lightning protection system in the blade. However, the hub connector 120 could be omitted and the conductive cable 125 coupled directly to the blade connector 110.

In the example in FIG. 5, the conductive surface 126 is secured to the wind turbine hub 20 and the brush 28 is fixed to the wind turbine nacelle 16 and provides an electrical path between the rotatable wind turbine hub 20 and the wind turbine nacelle 16.

The conductive surface 126 in the present example is fixed to the rotor hub 20 by means of non-conductive supports 127 to prevent the lightning discharge to be transferred to the rotor hub 20, and therefore avoiding that the lightning discharge passes through the rotor bearings 21'. The brush 128 may be fixed to the nacelle 16 following a similar approach, although the corresponding supports have not been depicted in this figure to reduced clutter. Alternatively, the conductive surface 126 may be secured to the wind turbine nacelle 16 and the brush 128 may be fixed to a wind turbine hub 20 to provide an electrical path between the wind turbine hub 20 and the wind turbine nacelle 16.

In the illustrated example, the conductive surface 126 is an annular metal disk, although the geometry of this element can be adapted to specific requirements of the lightning system.

In another aspect, FIG. 5 also shows a wind turbine hub assembly including a wind turbine rotor hub 20, at least one wind turbine blade 22, and a lightning bypass system. The wind turbine blade 22 comprises a blade root 24, and the lightning bypass system comprises a blade connector 110 made of an electrically insulating material 114 secured to the wind turbine blade and located substantially in a rotational axis R of the blade root 24 of the wind turbine, and a hub connector 120 made of an electrically insulating material 123 secured to the rotor hub 20 of the wind turbine. The blade connector 110 comprises a first end 111 configured to be electrically connected to a down conductor cable 100 of the blade, a second end 112 configured to conduct a lightning discharge to the hub connector 120 and a core 113 of electrically conductive material configured to electrically connect the first end 111 with the second end 112, wherein the second end 112 is rotatable with respect to the first end.

The blade connector comprises a bushing made of an electrically insulating material.

Further, the wind turbine hub assembly may include a hub connector 120 comprises a core 121 of electrically conductive material, electrically connected to the second end 112 of the blade connector 110 through a conductive element 116, the conductive element defining a path of connection 200.

The wind turbine hub assembly may further comprise a conductive surface 126 secured to the wind turbine rotor hub 20. In examples, the assembly may further comprise a brush 128 for providing electrical contact with the conductive surface 126, and a conductive cable 125 electrically connected to the hub connector 120 and to the conductive surface 126. The brush 128 is fixed to a wind turbine nacelle 16 and provides an electrical path between the wind turbine rotor hub 20 and the wind turbine nacelle 16.

Further, FIG. 5 illustrates that the rotor hub 20 may be mounted on a frame 21 through hub bearings 21', forming a rotatable connection between the hub and frame. The frame 21 supporting the rotor hub 20 may be connected to a further frame or other structural support in the nacelle 16.

In examples, the rotor hub may be connected to a rotor shaft through a flexible coupling. The flexible coupling may be configured to transmit torsion loads but to avoid transmission bending loads (or at least reduce the transmission hereof). The rotor shaft may drive a generator directly, or may form the slow speed shaft which forms the input shaft of a gearbox.

In the example of FIG. 5, a direct drive wind turbine is schematically illustrated. In this example, the rotor hub 20 may be jointed to an outer structure 162, which may include or be connected to a generator rotor. Thus, the outer structure 162 may rotate around a nacelle inner structure 161, which may include or form the generator stator.

Figure 6:
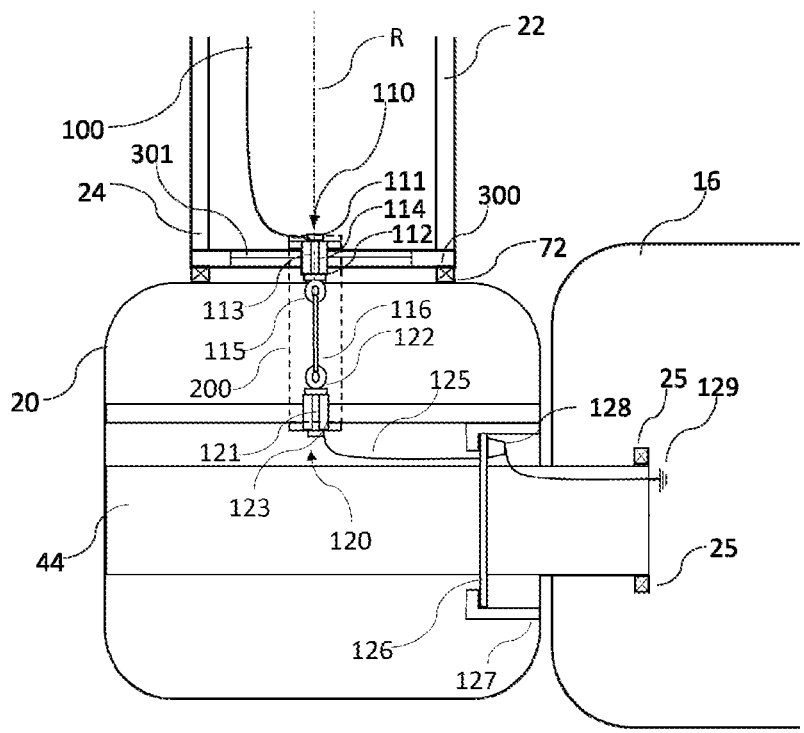
FIG. 6 schematically illustrates a flowchart of an example of a method for providing a wind turbine blade assembly.

FIG. 6 shows another example of the lightning system according to the present disclosure in a wind turbine configuration comprising a main rotor shaft 44 on which the rotor hub 20 is mounted. The main shaft 44 is configured to drive and may be operatively coupled to a shaft of a generator rotor, either directly or indirectly. In this example, the rotor shaft 44 is rotatably supported in the nacelle 16 by means of main bearings 25.

The lightning system according to the present disclosure is therefore suitable for a broad range of wind turbine configurations, i.e. direct drive wind turbines or wind turbines comprising a gearbox system among others.

Figure 7:
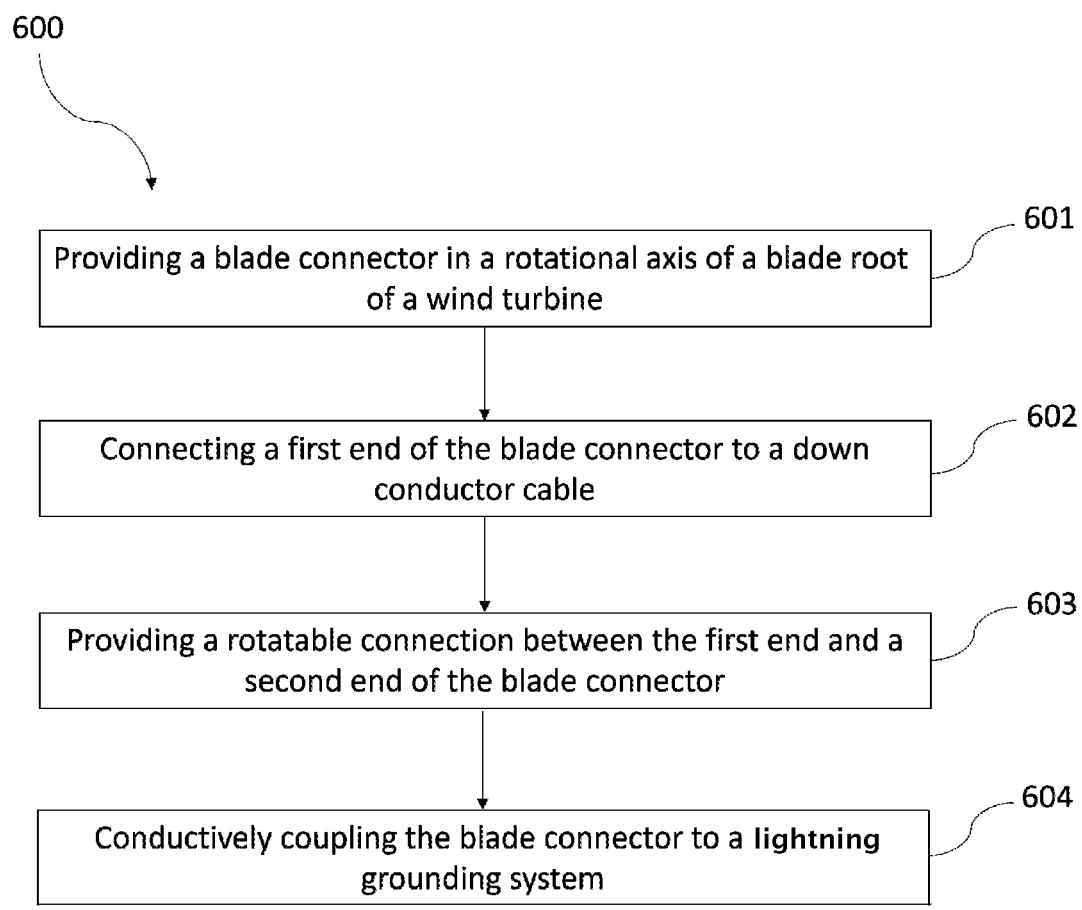
FIG. 7 is a flowchart of a method embodiment for providing a lightning bypass system.

In another aspect of the disclosure, a method 600 is provided. Method 600 is suitable for providing a lightning bypass system. Method 600 is schematically illustrated in FIG. 7.

The method comprises, at block 601, providing a blade connector 110 comprising an electrically insulating material 114 substantially located in a rotational axis R of a blade root 24 of (a wind turbine blade of) the wind turbine, wherein the blade connector 110 comprises a first end 111, a second end 112 and a core 113 of electrically conductive material electrically connected to the first end 111 and the second end 112. The blade connector 110 may be or comprise an electrically insulated bushing.

The method 600 also comprises, at block 602, connecting the first end 111 of the blade connector 110 to a down conductor cable 100 connected to a lightning receptor of a blade. Further, the method 600 comprises, at block 603 providing a rotatable connection between the first end 111 and the second end 112 of the blade connector 110. The rotatable connection can be provided, for example, by means of an eye bolt connector 115 located at the second end 112 of the blade connector 110.

Besides, the method 600, at block 604, comprises conductively coupling the second end of the blade connector to a lightning grounding system 129 of a wind turbine.

In examples, the method 600 for providing a lightning bypass system may comprise providing a conductive surface 126 secured to one of a wind turbine rotor hub 20 and a wind turbine nacelle 16 and electrically isolated from the same. Besides, it may comprise providing a brush 128 for electrical contact with the conductive surface 126, the brush 128 being fixed to the other of the wind turbine rotor hub 20 and the turbine nacelle 16 where the conductive surface 126 is secured, providing an electrical path between the wind turbine hub 20 and a wind turbine nacelle 16; and conductively coupling a cable 125 from the second end 112 of the blade connector 110 to the conductive surface 126.

In additional examples, the method 600 may comprise providing a hub connector 120 made of an electrically insulating material 123 secured to the hub 20 of the wind turbine; wherein the hub connector 120 comprises a core 121 of electrically conductive material; conductively coupling the second end 112 of the blade connector 110 to the hub connector 120 through a conductive element 116, the conductive element 116 defining a path of connection 200; and guiding a cable bundle 201 along the path of connection 200 defined by the conductive element 116. The cable bundle 201 may be part of a blade subsystem such as a blade monitoring system, a lightning monitoring system, a de-icing system or a blade aviation lightning system among others.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A lightning bypass system for a blade of a wind turbine, comprising:
    a blade connector comprising an electrically insulating material, the blade connector configured to be located at a rotational axis of a blade root of the wind turbine blade;
    the blade connector further comprising a first end configured to be electrically connected to a down conductor cable of the wind turbine blade, a second end configured to conduct a lightning discharge to a rotor hub of the wind turbine, and a core of electrically conductive material configured to be electrically connected to the first end and the second end.

2. The lightning bypass system according to claim 1, wherein the first end and the second end of the blade connector form a rotatable connection.

3. The lightning bypass system according to claim 1, wherein the second end of the blade connector comprises a rotatable eye bolt connector.

4. The lightning bypass system according to claim 1, further comprising a rotatable electrical connection between the second end of the blade connector and a wind turbine nacelle; the rotatable electrical connection comprising:
    a conductive surface;
    a brush to provide electrical contact with the conductive surface; and
    the second end of the blade connector electrically connected to one of the conductive surface or the brush.

5. The lightning bypass system according to claim 4, wherein one of the conductive surface or the brush is secured to a rotor hub of the wind turbine rotor hub and the other one of the conductive surface or the brush is fixed to the wind turbine nacelle to provide an electrical path between the wind turbine rotor hub and the wind turbine nacelle.

6. The lightning bypass system according to claim 4, wherein the conductive surface is an annular metal disk.

7. The lightning bypass system according to claim 1, further comprising a hub connector made of an electrically insulating material secured to a rotor hub of the wind turbine, the hub connector comprising a core of electrically conductive material, the core electrically connected to the second end of the blade connector through a conductive element.

8. The lightning bypass system according to claim 7, wherein the conductive element comprises an electrically insulating material cover.

9. The lightning bypass system according to claim 7, wherein a path of connection defined by the conductive element serves as a guide for a cable bundle.

10. The lightning bypass system according to claim 7, wherein the hub connector comprises a rotatable eye bolt connector.

11. A wind turbine blade, comprising the lightning bypass system according to claim 1.

12. The wind turbine blade according to claim 11, wherein the blade connector is attached to a blade flange of the wind turbine blade.

13. A method of providing a lightning bypass system in a wind turbine, the method comprising:
    providing a blade connector having an electrically insulating material at a rotational axis of a blade root of a blade of the wind turbine, wherein the blade connector includes a first end, a second end, and a core of electrically conductive material electrically connected to the first end and the second end;
    connecting the first end of the blade connector to a down conductor cable coming from a lightning receptor of the blade;
    providing a rotatable connection between the first end and the second end of the blade connector; and
    conductively coupling the blade connector to a lightning grounding system of the wind turbine.

14. The method according to claim 13, wherein the method further comprises:
    providing a conductive surface secured to one of a rotor hub or a nacelle of the wind turbine;
    providing a brush for electrical contact with the conductive surface, the brush fixed to the other of the rotor hub or the nacelle from where the conductive surface is secured, providing an electrical path between the rotor hub and the nacelle; and
    conductively coupling the second end of the blade connector to the conductive surface.

15. The method according to claim 14, further comprising:
    securing a hub connector made of an electrically insulating material to the rotor hub;
    wherein the hub connector includes a core of electrically conductive material;
    conductively coupling the second end of the blade connector to the hub connector through a conductive element, the conductive element defining a path of connection; and guiding a cable bundle along the path of connection defined by the conductive element.

* * * * *